United States Patent

Sato

[11] Patent Number: 6,148,180
[45] Date of Patent: Nov. 14, 2000

[54] RADIO COMMUNICATION APPARATUS

[75] Inventor: Hiroki Sato, Kanagawa, Japan

[73] Assignee: Matsushita Electric Industrial Co., Ltd., Osaka, Japan

[21] Appl. No.: 09/178,677

[22] Filed: Oct. 26, 1998

[30] Foreign Application Priority Data

Oct. 29, 1997 [JP] Japan .................................... 9-311618

[51] Int. Cl.$^7$ .................................................. H04B 17/00
[52] U.S. Cl. ...................... 455/67.7; 455/226.4; 455/421; 455/566
[58] Field of Search .............................. 455/226.4, 226.2, 455/67.7, 421, 566, 90

[56] References Cited

U.S. PATENT DOCUMENTS 5,239,684   8/1993   Ishikura ............................... 455/67.7
6,035,183   3/2000   Todd et al. ........................... 455/226.2

FOREIGN PATENT DOCUMENTS 2 275 848   7/1994   United Kingdom .

Primary Examiner—Lee Nguyen
Attorney, Agent, or Firm—Pearne & Gordon LLP

[57] ABSTRACT

Radio communication apparatus includes receiving unit 11 receives a radio wave from a radio base station, and converts the radio wave into an electric signal corresponding to the field strength of the radio wave. Based on the electric signal, judging device 12 judges whether the field strength of the radio wave from the radio base station is equal to or higher than a predetermined level sufficient for reception or not. Displaying device 14 displays a judgment result of the judging device 12 by display patterns such as pictures which are switched over at an interval of a constant time. From this display, the user can easily recognize the condition of the field strength in a visual manner.

13 Claims, 5 Drawing Sheets

SWITCHING TIMING OF DISPLAY

RADIO COMMUNICATION APPARATUS

BACKGROUND OF THE INVENTION

The present invention relates to a radio communication apparatus which displays the condition whether the field strength of a radio wave is at a receivable level or not, and particularly to a configuration in which the condition whether the field strength of a radio wave from a base station is at a receivable level in a current place or not is displayed by means of display patterns such as pictures that can be switched over at an interval of a constant time.

In a conventional radio-communication apparatus, when the field strength of a radio wave from a radio base station is at a receivable level in a current place, an antenna symbol is displayed in the uppermost or lower most area of a display unit, and, when the field strength is at an unreceivable level, the antenna symbol is not displayed or characters such as "outside of service" are displayed in the uppermost or lower most area of the display unit, thereby informing the user of the level of the field strength.

In a conventional radio communication apparatus, a message from a sender or characters and the like which are input by the user are displayed in a center area of a display unit. Therefore, an antenna symbol or characters which inform the user whether the field strength of a radio wave from a radio base station is at a receivable level or not are often displayed in the uppermost or lower most area of the display unit, and in a small size. Consequently, such a radio communication apparatus has a defect that a receivable state cannot be recognized at a glance.

Recently, a radio communication apparatus is produced in a reduced size, and hence it is difficult to increase the size of a display unit. Therefore, the above-mentioned antenna symbol or characters such as "outside of service" are hardly displayed in a large size.

SUMMARY OF THE INVENTION

It is an object of the invention to, in order to solve the problems, provide a radio communication apparatus in which the condition whether-a radio wave from a radio base station is at a receivable state or not is displayed by means of display patterns such as pictures which can be switched over at an interval of a constant time, thereby enabling the user to recognize the receivable state at a glance.

In order to attain the object, the radio communication apparatus of the invention comprises: receiving means for receiving a radio wave from a radio base station, and for converting the radio wave into an electric signal corresponding to a field strength of the radio wave; judging means for, based on the electric signal, judging whether the field strength of the radio wave from the radio base station is equal to or higher than a predetermined level sufficient for reception or not; controlling means for, based on a judgment result of the judging means, reading display patterns which are to be displayed, from storage means, and for switching over the display patterns at an interval of a constant time; displaying means for, based on instructions from the controlling means, displaying a display pattern which is to be displayed; and the storage means for storing information of display patterns which are to be displayed on the displaying means.

In this way, the condition whether a radio wave from a radio base station is at a receivable state or not is displayed by means of display patterns such as pictures which can be switched over at a constant timing. Therefore, the user can be informed of the receivable state by means of a moving pattern, and hence recognize at a glance whether the reception in the current place is enabled or not.

According to the invention, a radio communication apparatus comprises: receiving means for receiving a radio wave from a radio base station, and for converting the radio wave into an electric signal corresponding to a field strength of the radio wave; judging means for, based on the electric signal, judging whether the field strength of the radio wave from the radio base station is equal to or higher than a predetermined level sufficient for reception or not; controlling means for, based on a judgment result of the judging means, reading display patterns which are to be displayed, from storage means, and for switching over the display patterns at an interval of a constant time; displaying means for, based on instructions from the controlling means, displaying a display pattern which is to be displayed; and the storage means for storing information of display patterns which are to be displayed on the displaying means. The condition whether a radio wave from a radio base station is at a receivable state or not is displayed by means of patterns such as pictures which can be switched over at a constant timing, thereby performing a function that the user can be informed of the receivable state by means of display patterns such as a moving picture, and hence recognize at a glance whether the reception in the current place is enabled or not.

Additionally, the display patterns which are displayed on the displaying means as a result of judgment of the judging means consist of plural display patterns which include a character, a symbol, a picture, a mark, and the like, or a combination of the display patterns. The display patterns consisting of plural display patterns which include a character, a symbol, a picture, a mark, and the like, or a combination of the display patterns can be displayed with being switched over at a constant timing, thereby performing a function that the user can recognize at a glance whether the reception in the current place is enabled or not.

Further, the controlling means changes sizes of the display patterns which are displayed on said displaying means. The sizes of the display patterns can be changed, thereby performing a function that the user can recognize at a glance whether the reception in the current place is enabled or not.

Furthermore, the display patterns consist of one or more characters, and said controlling means changes sizes of the characters which are to be displayed. Since the sizes of the display patterns consisting of one or more characters can be changed, thereby performing a function that the user can recognize at a glance whether the reception in the current place is enabled or not.

Furthermore, the above-mentioned radio communication apparatus further comprises timing-setting changing means for changing the interval of a constant time at which display patterns are switched over. The invention attains an effect that the display timing can-be arbitrarily changed in accordance with preferences of the user.

Furthermore, plural combinations of plural display patterns which indicate a result of judgment on whether the field strength of the radio wave from the radio base station is equal to or higher than the predetermined level sufficient for reception or not are stored as display pattern sets in said storage means for storing display patterns, and said radio communication apparatus further comprises display pattern selecting means for selecting one of the display pattern sets. The invention attains an effect that a display pattern set can be selected from several display pattern sets in accordance with preferences of the user.

Furthermore, plural combinations of plural display patterns which indicate a result of judgment on whether the field strength of the radio wave from the radio base station is equal to or higher than the predetermined level sufficient for reception or not, and the interval of a constant time for switching a display are stored as display pattern sets in said storage means for storing display patterns, and said radio communication apparatus further comprises display pattern selecting means for selecting one of the display pattern sets. Since plural combinations of plural display patterns and the interval of a constant time for switching a display are stored as display pattern sets, the invention attains an effect that a display pattern set can be selected from several display pattern sets in accordance with preferences of the user.

Furthermore, according to the invention, in the radio communication apparatus, the judging means stepwise judges a degree relating to a condition whether the field strength of the radio wave from the radio base station is equal to or higher than a predetermined level sufficient for reception or not. The interval of a constant time for switching display patterns is automatically changed in response to the level of field strength. The invention attains an effect that the field strength of a radio wave can be finely displayed in a stepwise manner.

Furthermore, said radio communication apparatus further comprises judging means for stepwise judging a degree relating to a condition whether the field strength of the radio wave from the radio base station is equal to or higher than the predetermined level sufficient for reception or not, plural combinations of plural display patterns which indicate a result of the stepwise judgment are stored as display pattern sets in said storage means for storing display patterns, and a display pattern set is enabled to be automatically changed in accordance with the level of the field strength obtained as a result of the stepwise judgment. The invention attains an effect that the field strength of a radio wave can be finely displayed in a stepwise manner.

Further, said radio communication apparatus further comprises judging means for stepwise judging a degree relating to a condition whether the field strength of the radio wave from the radio base station is equal to or higher than the predetermined level sufficient for reception or not, plural combinations of plural display patterns which indicate a result of the stepwise judgment, and the interval of a constant time for switching a display are stored as display pattern sets in said storage means for storing display patterns, and a display pattern set is enabled to be automatically changed in accordance with the level of the field strength obtained as a result of the stepwise judgment. The invention attains an effect that the field strength of a radio wave can be finely displayed in a stepwise manner.

Still further, in judgment of the degree relating to the condition whether the field strength of the radio wave from the radio base station is equal to or higher than the predetermined level sufficient for reception or not, a mode in which one of an outside of a service and an inside of the service is alternatively judged, and a mode in which judgment is stepwise performed are set as judgment modes, and said radio communication apparatus further comprises judgment mode switching means, thereby enabling the judgment modes to be arbitrarily switched over. The invention attains an effect that the user can switch over the judgment modes so that the current field strength can be known in more detail.

Still furthermore, said plural display pattern sets which indicate a result of judgment on whether the field strength of the radio wave from the radio base station is equal to or higher than a predetermined level sufficient for reception or not are display pattern sets containing numerals, and a numeric value corresponding to a stepwise judgment level of the field strength is displayed. The invention attains an effect that the condition of the field strength can be known in a digital manner.

DETAILED DESCRIPTION OF THE PREFERRED EMBODIMENTS

Hereinafter, embodiments of the invention will be described with reference to FIGS. 1 to 9.

Figure 1:
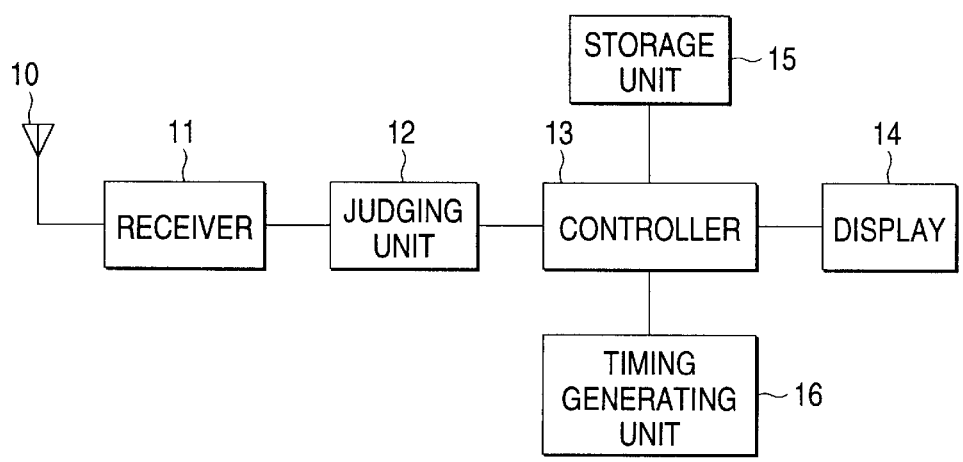
FIG. 1 is a block diagram showing the configuration of a radio communication apparatus of an embodiment of the invention.

FIG. 1 is a block diagram of a radio communication apparatus and showing the configuration of an embodiment of the invention. Referring to FIG. 1, the radio communication apparatus comprises: an antenna 10; receiving means 11 for receiving a radio wave input through the antenna 10, and for converting the radio wave into an electric signal corresponding to the field strength of the radio wave; judging means 12 for judging whether the level of the electric signal converted by the receiving means 11 is equal to or higher than a predetermined level sufficient for reception or not; controlling means 13 for controlling the whole of the radio communication apparatus, and for, based on a judgment result of the judging means 12, reading display patterns which are stored in storage means 15 that will be described below, and which are to be displayed; displaying means 14 for displaying the display patterns; the storage means 15 for storing information of display patterns such as pictures which are to be displayed on the displaying means 14; and timing generating means 16 for supplying a timing for switching over the display on the displaying means 14 at a timing of a constant time, to the controlling means 13.

Figure 2:
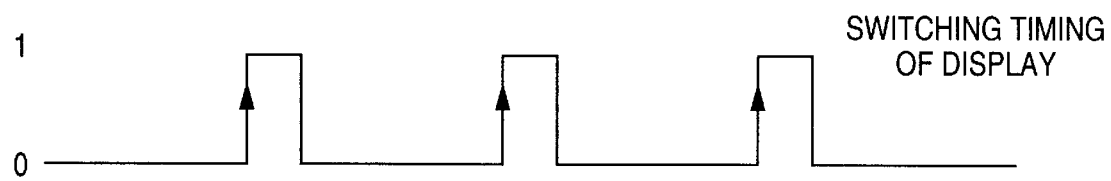
FIG. 2 is a timing chart for switching over display patterns which display a judgment result in the embodiment of the invention.

Next, the operation of the radio communication apparatus of the embodiment of the invention will be described with reference to FIGS. 2 and 3. FIG. 2 is a timing chart for switching over the pattern displays of the displaying means 14 by the controlling means 13, in accordance with the timing generated by the timing generating means 16.

Figure 3A:
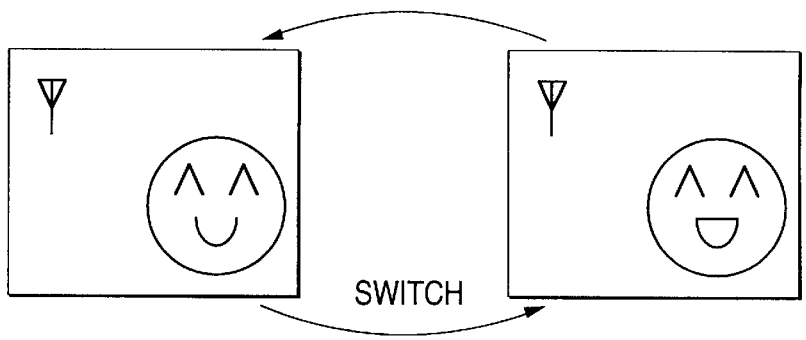
FIG. 3A is a diagram showing display contents in the case where reception is enabled in the embodiment of the invention.
Figure 3B:
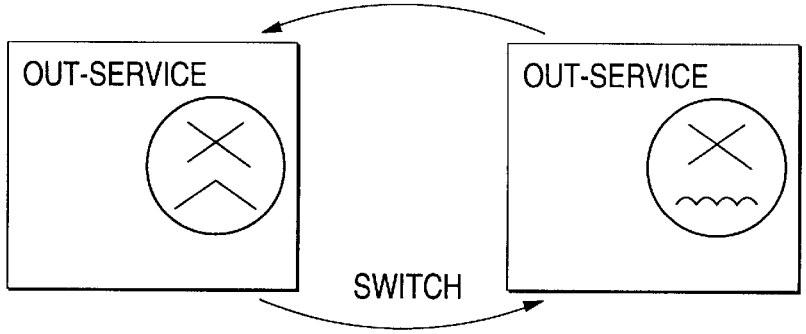
FIG. 3B is a diagram showing display contents in the case where reception is disabled in the embodiment of the invention.

FIG. 3 shows the contents of display patterns which are to be displayed on the displaying means 14 based on a judgment result of the judging means 12. Specifically, FIG. 3A shows the display contents in the case where the field strength is at the receivable level, and FIG. 3B shows those in the case where the field strength is at an unreceivable level.

The receiving means 11 receives a radio wave from a radio base station and converts the radio wave into an electric signal corresponding to the field strength of the radio wave. Based on the electric signal, the judging means 12 judges whether the field strength of the radio wave from the radio base station is equal to or higher than a predetermined level sufficient for reception or not. The controlling means 13 performs a control so that the judgment result of the judging means 12 is displayed as display patterns such as pictures on the displaying means 14. At the timing when the level of the signal from the timing generating means 16 is raised from "0" to "1" (see FIG. 2), the controlling means 13 switches the display pattern such as a picture displayed on the displaying means 14 as shown in FIG. 3, so that the judgment result can be informed to the user by means of display patterns such as a moving picture.

As a result, unlike the display in the prior art which is performed by means of an antenna symbol or characters, the display is performed by means of display patterns such as a moving picture, and hence the user can recognize at a glance whether the radio wave from the radio base station can be received in the current place or not.

The display patterns which are to be displayed on the basis of a result of the judgment on whether the field strength of the radio wave from the radio base station is equal to or higher than a predetermined level sufficient for reception or not are not restricted to the pictures of FIG. 3, and may include a character, a symbol, a picture, a mark, and the like, or a combination of these display patterns. The number of display patterns such as pictures which are to be switched over is not limited to two as shown in FIG. 3. Alternatively, a larger number of display patterns may be sequentially switched over.

Figure 4A:
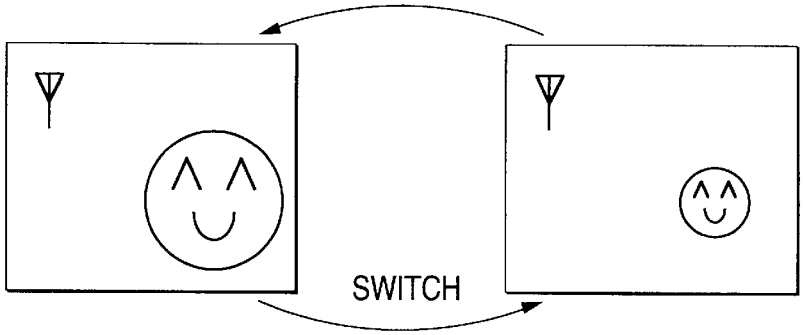
FIGS. 4A and 4B are diagrams showing other display contents in the embodiment of the invention.
Figure 4B:
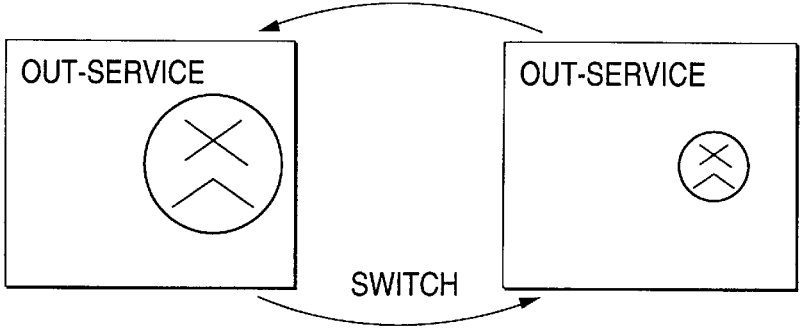
Figure 5A:
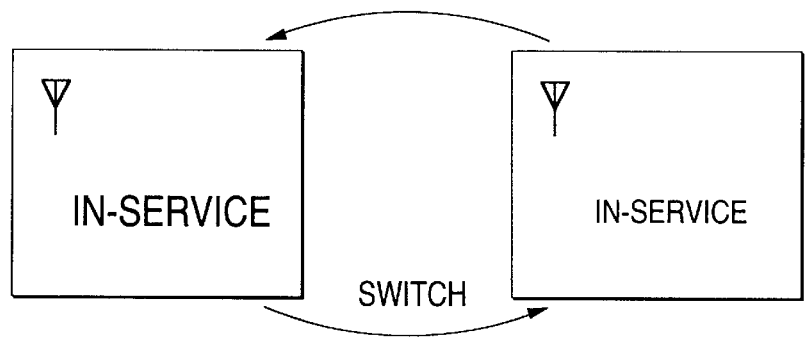
FIGS. 5A and 5B are diagrams showing further display contents in the embodiment of the invention.
Figure 5B:
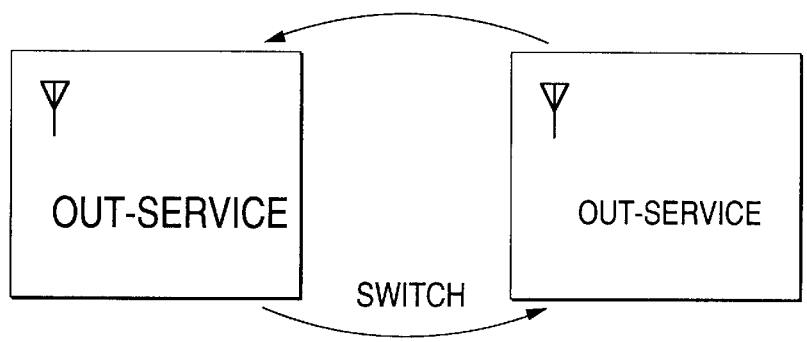

FIGS. 4 and 5 show display examples in another embodiment of the invention in which plural display patterns indicating a result of the judgment on the field strength are realized by a combination of display patterns of different sizes. Different display sizes of the same display pattern are previously stored in the storage means 15. Therefore, the controlling means 13 can control the display so that the same display pattern is displayed with sequentially changing the size of the pattern. When patterns of the same contents and having different sizes are repeatedly displayed as shown in FIGS. 4A and 4B, the display patterns perform repeated expansion and contraction in the same manner as heartbeats, thereby attaining an effect that the appeal of the display is enhanced. Even in the case of display patterns consisting of characters, when the size is switched over as shown in FIGS. 5A and 5B, the characters themselves perform repeated expansion and contraction. Therefore, this configuration has an effect that the reception condition can appeal to the viewer more strongly than the case where the display is performed by means of normal small characters only.

Figure 6:
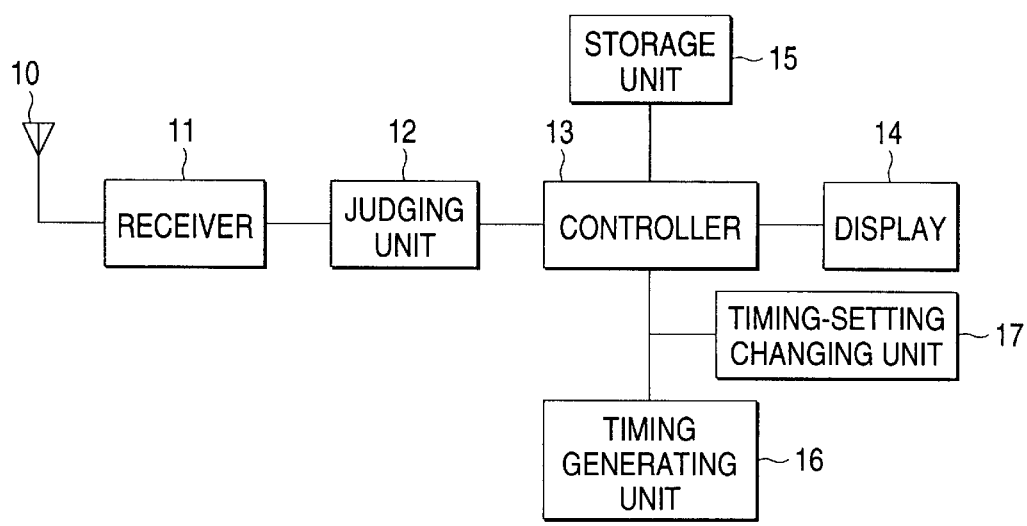
FIG. 6 is a block diagram showing the configuration of a radio communication apparatus of another embodiment of the invention.
Figure 7A:
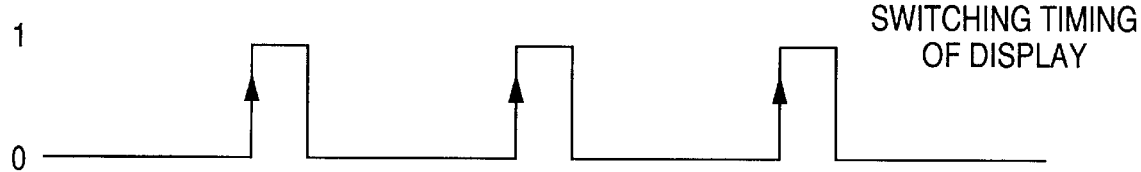
FIG. 7 is a timing chart for switching over display patterns which display a judgment result in the other embodiment of the invention.
Figure 7B:
Figure 7C:
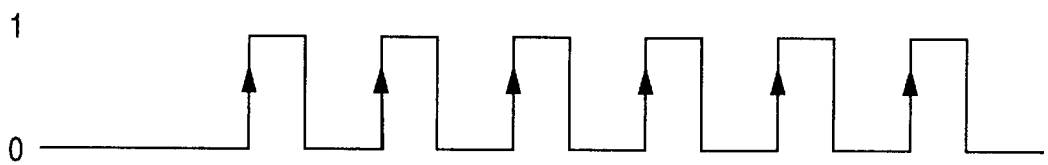

FIG. 6 is a block diagram showing another embodiment of the invention. In the embodiment, timing setting changing means 17 is added to the configuration shown in the block diagram of FIG. 1,. so that the interval of a constant time at which display patterns is switched over can be previously changed in accordance with a result of the judgment on the field strength of the radio wave from the radio base station. For example, the time interval of (a) in FIG. 7 is assumed as a standard time interval. By using the timing setting changing means 17, the time-interval can be set to a long time interval of (b) in FIG. 7, or to a short time interval (c) of FIG. 7. Consequently, the embodiment has an effect that the time interval can be arbitrarily set in accordance with preferences of the user. For example, a long time interval may be set for a slow person and a short time interval for a hasty person.

Figure 8:
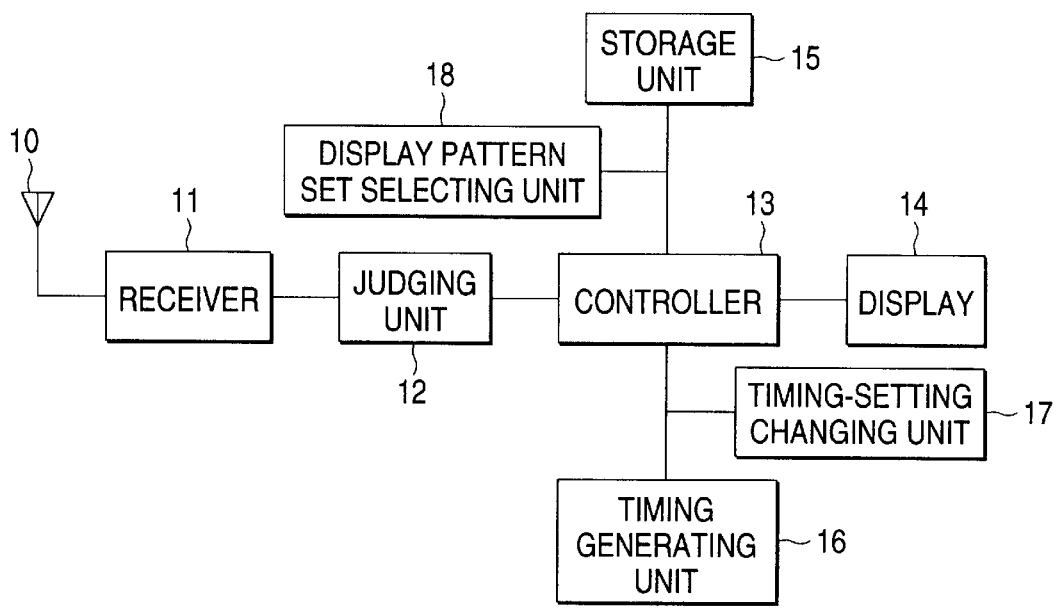
FIG. 8 is a block diagram showing the configuration of a radio communication apparatus of a further embodiment of the invention.

FIG. 8 is a block diagram showing a further embodiment of the invention. In the embodiment, display pattern set selecting means 18 is added to the configuration shown in the block diagram of FIG. 6. The embodiment is configured so that several combinations of plural display patterns which are to be displayed in accordance with a result of the judgment on the field strength of the radio wave from the radio base station are previously stored as display pattern sets in the storage means 15, and the user can arbitrarily select one of the sets through the display pattern set selecting means 18. According to this configuration, the embodiment has an effect that a display pattern set can be selected from the several display pattern sets in accordance with preferences of the user.

Alternatively, plural combinations of plural display patterns which indicate a result of the judgment on the field strength of the radio wave from the radio base station, and the interval of a constant time for switching the display may be stored as display pattern sets in the storage means for storing display patterns. In the alternative, the setting of the switching time interval-can be changed at the same time with the selection of a combination of display patterns. Therefore, this configuration has an effect that the user is provided with a wider range of selection.

Figure 9A:
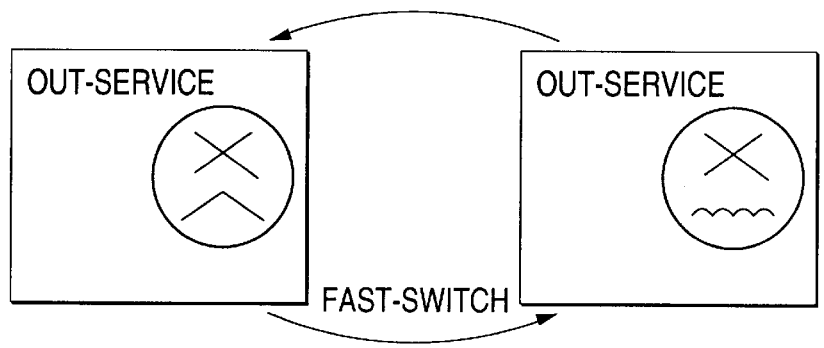
FIGS. 9A to 9D are diagrams showing display contents in the further embodiment of the invention.
Figure 9B:
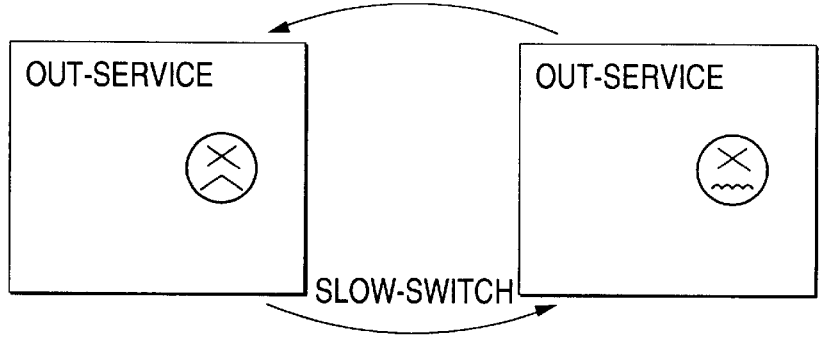
Figure 9C:
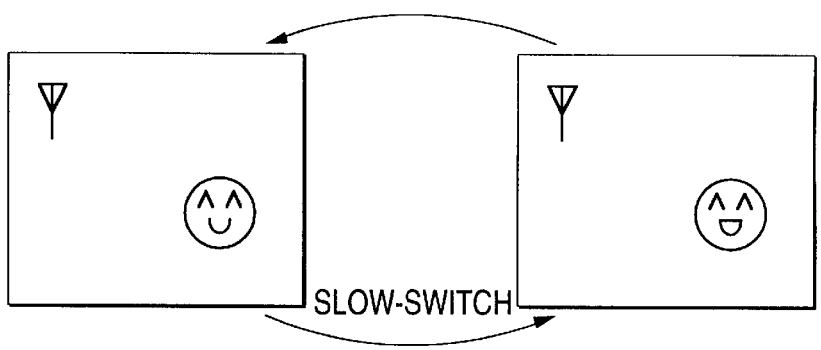
Figure 9D:
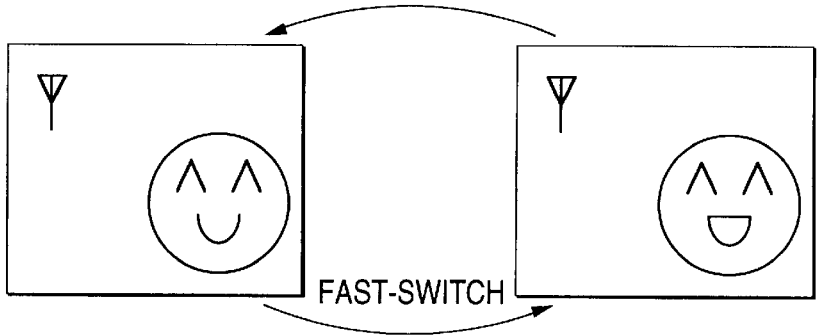

A radio communication apparatus may comprises: receiving means for receiving a radio wave from a radio base station, and for converting the radio wave into an electric signal corresponding to the field strength of the radio wave; and judging means for, based on said electric signal, stepwise judging a degree relating to a condition whether the field strength of the radio wave from the radio base station is equal to or higher than a predetermined level sufficient for reception or not. Furthermore, display pattern sets and switching time intervals which respectively correspond to the steps may be previously stored in storage means. Based on a result of the stepwise judgment on the degree relating to the condition whether the field strength is equal to or higher than a predetermined level sufficient for reception or not, a display pattern set and a switching time interval may be automatically selected. This configuration has an effect that the field strength of a radio wave can be finely displayed in a stepwise manner. For example, the display may be performed as shown in a display example of FIG. 9. When the radio communication apparatus is outside of the service, large outside-of-service icons of FIG. 9A are displayed with switching over them at a short time interval. When the radio communication apparatus is outside of the service and approaching to the range, small outside-of-service icons of FIG. 9B are displayed with switching over them at a long time interval. When the radio communication apparatus enters the range, small inside-of-service icons of FIG. 9C are displayed with switching over them at a long time interval. When the field strength is further enhanced, large inside-of-service icons of FIG. 9D are displayed with switching over them at a short time interval. In this way, the configuration has an effect that the condition of the field strength can be displayed in a fine stepwise manner.

In the above, the mode in which, in the judgment on the degree relating to the condition whether the field strength of the radio wave from the radio base station is equal to or higher than a predetermined level sufficient for reception or not, the degree is alternatively judged as either of the outside of the service and the inside of the service as shown in FIG. 3, and the other mode in which the judgment is performed in a stepwise manner and the condition is finely displayed as shown in FIG. 9 have been separately described. Alternatively, the judging means 12 may be provided with both the judgment modes, namely the alternating judgment mode and the stepwise judgment mode, and judgment mode switching means may be added to the controlling means 13. This configuration has an effect that, when the outside of service is displayed as a result of the alternating judgment mode, for example, the user who wishes to know the detail of the degree of the outside of the service or whether the field strength is at a level where communication is entirely disabled or not can switch over the judgment mode to know the current condition of the field strength in more detail.

The plural display pattern sets which indicate a result of the stepwise judgment may contain numerals. For example, the condition of the field strength may be displayed as one of "Level 1," "Level 2," "Level 3," and "Level 4." In this way, the configuration has an effect that the user is informed of the condition of the field strength in a digital manner.

As described above, the invention can attain an advantage that the condition whether a radio wave from a radio base station is at a receivable state or not is displayed by means of display patterns such as pictures which can be switched over at a constant timing, thereby enabling the user to recognize at a glance whether the reception in the current place is enabled or not.

What is claimed is:

1. A radio communication apparatus comprising:
   receiving means for receiving a radio wave from a radio base station, and for converting the radio wave into an electric signal corresponding to a field strength of the radio wave;
   judging means for judging whether the field strength of the radio wave from the radio base station is equal to or higher than a predetermined level sufficient for reception based on said electric signal;
   controlling means for reading display patterns from storage means based on a judgment result of said judging means, and for switching over the display patterns at an interval of a constant time;
   displaying means for displaying a display pattern according to instructions from said controlling means; and
   said storage means for storing information of display patterns which are to be displayed on said displaying means.

2. A radio communication apparatus according to claim 1, wherein said display patterns includes plural display patterns including a character, a symbol, a picture, a mark, or a combination of the display patterns.

3. A radio communication apparatus according to claim 2, wherein said controlling means changes sizes of the display patterns which are displayed on said displaying means.

4. A radio communication apparatus according to claim 3, wherein the display patterns are characters, and said controlling means changes sizes of the characters.

5. A radio communication apparatus according to claim 1, further comprising timing-setting changing means for changing the interval of a constant time at which display patterns are switched over.

6. A radio communication apparatus according to claim 2, further comprising timing-setting changing means for changing the interval of a constant time at which display patterns are switched over.

7. A radio communication apparatus according to claim 1 or 5, wherein plural combinations of plural display patterns which indicate a result of judgment on whether the field strength of the radio wave from the radio base station is equal to or higher than the predetermined level sufficient for reception or not are stored as display pattern sets in said storage means for storing display patterns, and
   said radio communication apparatus further comprises display pattern selecting means for selecting one of the display pattern sets.

8. A radio communication apparatus according to claim 1 or 5, wherein plural combinations of plural display patterns which indicate a result of judgment on whether the field strength of the radio wave from the radio base station is equal to or higher than the predetermined level sufficient for reception or not, and the interval of a constant time for switching a display are stored as display pattern sets in said storage means for storing display patterns, and said radio communication apparatus further comprises display pattern selecting means for selecting one of the display pattern sets.

9. A radio communication apparatus according to claim 1, further comprising: timing-setting changing means for changing the interval of a constant time at which display patterns is switched over,
   wherein said judging means stepwise judging a degree relating to a condition whether the field strength of the radio wave from the radio base station is equal to or higher than a predetermined level sufficient for reception, and
   the interval of a constant time for switching display patterns is automatically changed according to the degree of the field strength judged by said judging means.

10. A radio communication apparatus according to claim 1 or 9, further comprising: judging means for stepwise judging a degree relating to a condition whether the field strength of the radio wave from the radio base station is equal to or higher than the predetermined level sufficient for reception,
    wherein plural combinations of plural display patterns which indicate a result of the stepwise judgment are stored as display pattern sets in said storage means for storing display patterns, and a display pattern set is enabled to be automatically changed in accordance with the level of the field strength obtained as a result of the stepwise judgment.

11. A radio communication apparatus according to claim 10, wherein said plural display pattern sets which indicate a result of judgment on whether the field strength of the radio wave from the radio base station is equal to or higher than a predetermined level sufficient for reception or not are display pattern sets containing numerals, and a numeric value corresponding to a stepwise judgment level of the field strength is displayed.

12. A radio communication apparatus according to claim 1 or 9, wherein, in judgment of the degree relating to the condition whether the field strength of the radio wave from the radio base station is equal to or higher than the predetermined level sufficient for reception or not, a mode in which one of an outside of a service and an inside of the service is alternatively judged, and a mode in which judgment is stepwise performed are set as judgment modes, and said radio communication apparatus further comprises judgment mode switching means, thereby enabling the judgment modes to be arbitrarily switched over.

13. A radio communication apparatus according to claim 1 or 9, further comprising: judging means for stepwise judging a degree relating to a condition whether the field strength of the radio wave from the radio base station is equal to or higher than the predetermined level sufficient for reception, wherein plural combinations of plural display patterns which indicate a result of the stepwise judgment, and the interval of a constant time for switching a display are stored as display pattern sets in said storage means for storing display patterns, and a display pattern set is enabled to be automatically changed in accordance with the level of the field strength obtained as a result of the stepwise judgment.

* * * * *